United States Patent [19]

Sutrina et al.

[11] Patent Number: 5,780,997
[45] Date of Patent: Jul. 14, 1998

[54] VARIABLE RELUCTANCE ALTERNATING CURRENT GENERATOR

[75] Inventors: Thomas A. Sutrina; David W. Lefavour, both of Rockford, Ill.

[73] Assignee: Sundstrand Corporation, Rockford, Ill.

[21] Appl. No.: 723,627

[22] Filed: Oct. 3, 1996

[51] Int. Cl.$^6$ .................................................. H02P 9/44
[52] U.S. Cl. .............................. 322/29; 322/46; 318/701
[58] Field of Search ................................ 318/701; 322/10, 322/28, 29, 32, 46

[56] References Cited

U.S. PATENT DOCUMENTS

| | | | |
|---|---|---|---|
| 3,041,486 | 6/1962 | Moffitt | 310/168 |
| 4,500,824 | 2/1985 | Miller | 318/701 |
| 4,636,674 | 1/1987 | Peterson | 310/155 |
| 4,639,626 | 1/1987 | McGee | 310/155 |
| 4,992,920 | 2/1991 | Davis | 363/36 |
| 5,012,177 | 4/1991 | Dhyanchand et al. | 322/10 |
| 5,039,932 | 8/1991 | Belanger et al. | 322/32 |
| 5,084,662 | 1/1992 | Palaniappan et al. | 318/701 |
| 5,204,604 | 4/1993 | Radun | 318/701 |
| 5,327,069 | 7/1994 | Radun et al. | 322/10 |
| 5,459,385 | 10/1995 | Lipo et al. | 318/701 |
| 5,489,810 | 2/1996 | Ferreira et al. | 310/54 |
| 5,493,195 | 2/1996 | Heglund et al. | 318/701 |
| 5,563,488 | 10/1996 | Stephenson et al. | 318/701 |

*Primary Examiner*—Thomas M. Dougherty
*Assistant Examiner*—Nicholas Ponomarenko
*Attorney, Agent, or Firm*—Antonelli, Terry, Stout & Kraus

[57] ABSTRACT

A variable reluctance generator for producing alternating current at a fundamental frequency independent of a rotational speed at which the generator is driven in accordance with the invention includes a rotor having a plurality of salient poles disposed around a circumference and projecting radially outward from an axis of rotation; a stator having a plurality of salient poles disposed about an inner circumference and projecting radially inward toward the rotor; at least one stator phase winding wound on the stator for outputting the electrical power of the fundamental frequency; an exciter winding wound on the stator; an electrical load coupled to the at least one stator phase winding; a position detector for providing a rotor position signal representing a rotary position of the rotor; a first switching circuit, responsive to the rotor position signal, for applying time varying excitation current at the fundamental frequency or a multiple thereof to the exciter winding in a series of pulses of varying magnitude which define the fundamental frequency and are produced by current flow through the exciter winding by switching of the first switching circuit to cause the current flow in each current pulse and each pulse being timed in relation to an occurrence of a lowest reluctance rotary position of the salient poles of the rotor and stator during rotation of the salient poles of the rotor between adjacent salient poles of the stator so as to generate a pulse on the at least one stator phase winding in response to a pulse on the exciter winding and rotation of the rotor away from the low reluctance rotary position; a current sensor for detecting a direction of current flow in the electrical load; and a second switching circuit, coupled to the at least one stator phase winding and to the electrical load and responsive to the current sensor, for controlling a direction of current flow through the electrical load so that each pulse applied to the exciter winding produces a corresponding pulse in the electrical load without backflow of current.

22 Claims, 8 Drawing Sheets

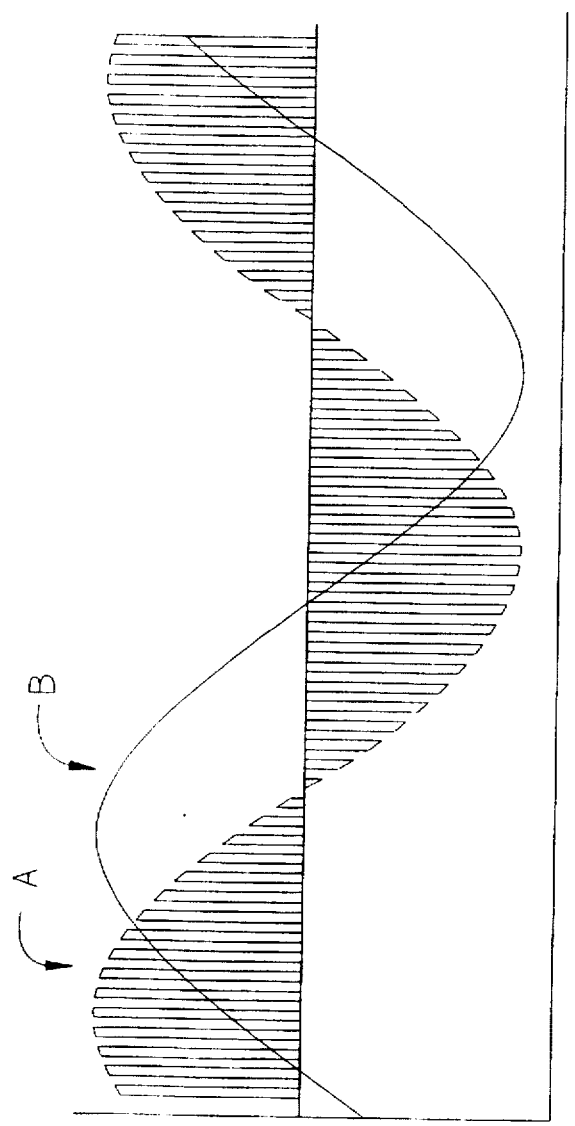

VARIABLE RELUCTANCE ALTERNATING CURRENT GENERATOR

TECHNICAL FIELD

The present invention relates to variable reluctance alternating current generators and more particularly to variable reluctance generators which generate alternating current at a desired fundamental frequency independent of rotor speed.

BACKGROUND ART

Variable (switch) reluctance magnetic machines which operate as motors or generators are well known in the art. For example, see U.S. Pat. Nos. 3,041,486, 4,636,674, 4,639,626, 5,012,177, 5,039,932, 5,204,604, 5,327,069, 5,489,810 and 5,493,195 for diverse designs of variable reluctance magnetic machines.

Variable reluctance magnetic machines have several advantages over other types of electrical machines which have wound or permanent magnet rotors. Motors and generators having wound rotors have certain speed limitations and further have limits on the temperature to which the rotor may be heated during operation without damage or destruction of the rotor windings. Motors and generators having permanent magnet rotors also have certain speed limitations and also have limitations on the temperature to which the rotor may be heated during operation without damage of the permanent magnet. High strength magnets are held in place with at least a containment ring, adhesive or a wedging feature to resist centrifugal forces. On the other hand, variable reluctance machines have a rotor of magnetically permeable material which is not wound with any electrical windings or retention of a permanent magnet. As a result, higher speed operation is possible because centrifugal forces do not affect the windings or magnet and further higher operational temperatures are possible because again, there are no windings or magnets on the rotor to be damaged by high temperature operation.

Typical power generators rotate the rotor at a constant speed to synchronously generate electrical power. The rotation of the rotor of a synchronous generator permits constant frequency electrical power to be generated such as three phase 400 Hz. alternating current. In airframes three phase 400 Hz. alternating current is produced by a constant speed drive which converts a variable speed power takeoff from a thrust engine into a constant speed drive which rotates the rotor of a three phase alternator. The control of the constant speed drive to produce a constant rotational speed of the three phase alternator is complex, expensive and requires periodic maintenance.

FIG. 1 illustrates an end view of a prior art variable reluctance electrical power generator 10. The generator 10 has a rotor 12 without windings which is manufactured from a magnetically permeable material such as iron. The rotor 12 has a plurality of salient poles 14 which are disposed around and project radially outward from an axis of rotation 18. The generator 10 has a stator 20 which is manufactured from magnetically permeable material having a plurality of salient poles 22 disposed radially inward towards the rotor 12. At least one stator phase winding 26 and typically three stator phase windings (phases A, B and C) are wound on the stator for outputting electrical power at a fundamental frequency proportional to the rotational speed of the rotor 12.

In FIG. 1 the alignment of salient poles 14 and 22 continuously changes as the rotor 12 turns. DC voltage and current is applied to each stator phase winding 26 to build up magnetic flux by converting electrical energy into magnetic energy when the salient poles associated with one stator phase winding 26 is in the lowest reluctance position 28. The application of torque from an external drive, performs work from rotation which results in the generation of electrical current and voltage on each stator winding 26 associated with rotation from position 28 to position 30 which is a higher reluctance position. At the same time, the magnetic flux built up at the lowest reluctance position 28 decreases by the application of torque and rotation work. The highest reluctance position occurs between positions 30 and 32 in the rotation of the rotor 12 where the flux is zero. No current is generated and torque from the salient poles is zero. The change in the reluctance from the highest position 32 to the lowest position 28 is the motoring portion of the cyclic relationship of salient poles 14 and 22. Voltage applied across and current in winding 26 is converted by flux and change in reluctance to a build up of flux and torque. Electrical energy is converted to magnetic energy and mechanical energy.

The control current and generated current pulses are directly related to rotor salient pole position and rotational speed. If the exciter winding 26 is repeatedly pulsed with a similar amount of direct current when the salient poles 14 and 22 of rotor 12 and stator 20 are in successive low reluctance positions, direct current output pulses are produced at a rate proportional to rotational speed. Alternating current can also be generated by applying alternating exciting pulses when the salient poles 14 and 22 are in successive low reluctance positions with alternating current output pulses being produced at a rate proportional to the rotational speed. Due to the limited rotational speed and the limited number of low reluctance positions available per revolution, the alternating control pulses are employed creating an alternating current output proportional to rotational speed.

DISCLOSURE OF INVENTION

The present invention is a variable reluctance generator for producing alternating current at a fundamental frequency independent of a rotational speed at which the generator is driven. With the invention in a first embodiment, a first switching circuit is used for applying timed excitation current regulated to the fundamental frequency of the alternating current to be generated to the exciter winding in a series of pulses of positive and negative polarity of varying magnitude which define the fundamental frequency. Each pulse is timed in relation to an occurrence of a low reluctance rotary position of salient poles of the rotor and stator during rotation of the salient poles of the rotor between opposed salient poles of the stator to generate a pulse on at least one stator phase winding in response to a pulse on the exciter winding and rotation of the rotor away from the lowest reluctance rotary position. A position detector provides a rotor position signal representing a rotary position of the rotor which is utilized by the first switching circuit for applying the series of pulses of varying magnitude at the appropriate time intervals during rotation of the rotor at which the salient poles of the rotor and stator are closest to their lowest reluctance position. Because the present invention may be utilized in applications in which the rotor is driven at extremely high speeds, it may be necessary because of the inductance of the exciter winding to advance the timing of connection of a direct current source to the exciter winding to produce each pulse to facilitate the buildup of current at the fundamental frequency from a series of pulses therein to produce the required magnetic field in the stator which is necessary for the generation of electrical power. Furthermore, feedback of the generated electrical power from an output which is applied to an electrical load may be compared to a reference signal to produce an error signal representing the difference between the feedback to control switching of the first switching circuit to cause the electrical power produced on the at least one stator phase winding to track the reference signal.

A current sensor is coupled to the electrical load for detecting a direction of current flow in the electrical load and a second switching circuit is coupled to the at least one stator phase in winding and to the electrical load and is responsive to the current sensor for controlling a direction of current flow through the electrical load so that each pulse applied to the exciter produces a pulse of corresponding polarity in the electrical load and reversed current flow is prevented to prevent motor operation. The second switching circuit may be comprised of a plurality of gated solid state switches which, in response to a sensed direction of fundamental current flow through the load that includes an output filter, provides activation of at least one and, preferably, a pair of electrical switches to steer the flow of the fundamental electrical current in the correct direction through the electrical load as the flow of electrical current passes between zero crossing points which otherwise would produce motoring operation.

In a second embodiment, the series of pulses may be applied by the first switching circuit to the exciter winding as an envelope defined by pulsating DC pulses at twice the fundamental frequency which has the appearance of rectification of the positive and negative going pulses produced by the first switching circuit, as described above, and the switching of the switches in the second switching circuit may be modified to invert the DC pulses in the envelope at twice the fundamental frequency into the fundamental frequency.

The rotor may be driven at variable speeds while producing constant frequency output power at the fundamental frequency. The first switching circuit applies in response to the rotor position signal a series of pulses of current defining an envelope at the fundamental frequency or twice the fundamental frequency, as described above, timed with respect to the lowest reluctance position between the salient poles of the rotor and stator which vary in number for each cycle of fundamental frequency in direct proportion to a rotational speed of the rotor. In other words, regardless of what the rotational speed of the rotor is, the exciter winding is excited each time the salient poles of the rotor and stator are aligned in their lowest reluctance position with the magnitude of the pulses being controlled to reproduce the fundamental frequency of current in the exciter winding.

Suitable filtering is coupled to the second switching circuit to attenuate frequencies having a maximum in the output from the at least one stator winding which are below a frequency of application of the pulses to the exciter winding. Preferably, the generator is a three phase generator producing constant frequency electrical output power independent of the speed of driving of the rotor. As a result, for applications, such as airframes, it is possible to eliminate the constant speed drive used with synchronous electrical power generation and further, optimize the characteristics of the variable reluctance generator to reduce weight because the rotor may be driven at higher speeds as a result of the variable reluctance design.

Furthermore, the excitation of the system may be varied to produce a controlled or variable frequency output purely with the control of the waveform of the excitation of the exciter winding by producing an excitation having the desired waveform through a series of pulses whose magnitude is modulated at each low reluctance position between the salient poles of the rotor and stator to produce the desired excitation waveform.

Furthermore, the size of the generator and all the filtering components are proportional to the peak energy stored within each element. Due to the high frequency of the excitation pulses and the corresponding generated pulses, this energy is much smaller than the peak energy that would be stored if the element operated at the fundamental frequency. Offsetting this is the lower efficient use of the mass of the elements at higher frequencies and higher rate of energy transfer.

BRIEF DESCRIPTION OF THE DRAWINGS

FIG. 9 illustrates the individual current pulses produced on the output of the electrical power generating system of the present invention in response to the current pulses applied to the exciter and further, the resultant voltage waveform after filtering on the output.

Like reference numerals identify like parts throughout the drawings.

BEST MODE FOR CARRYING OUT THE INVENTION

Figure 1:
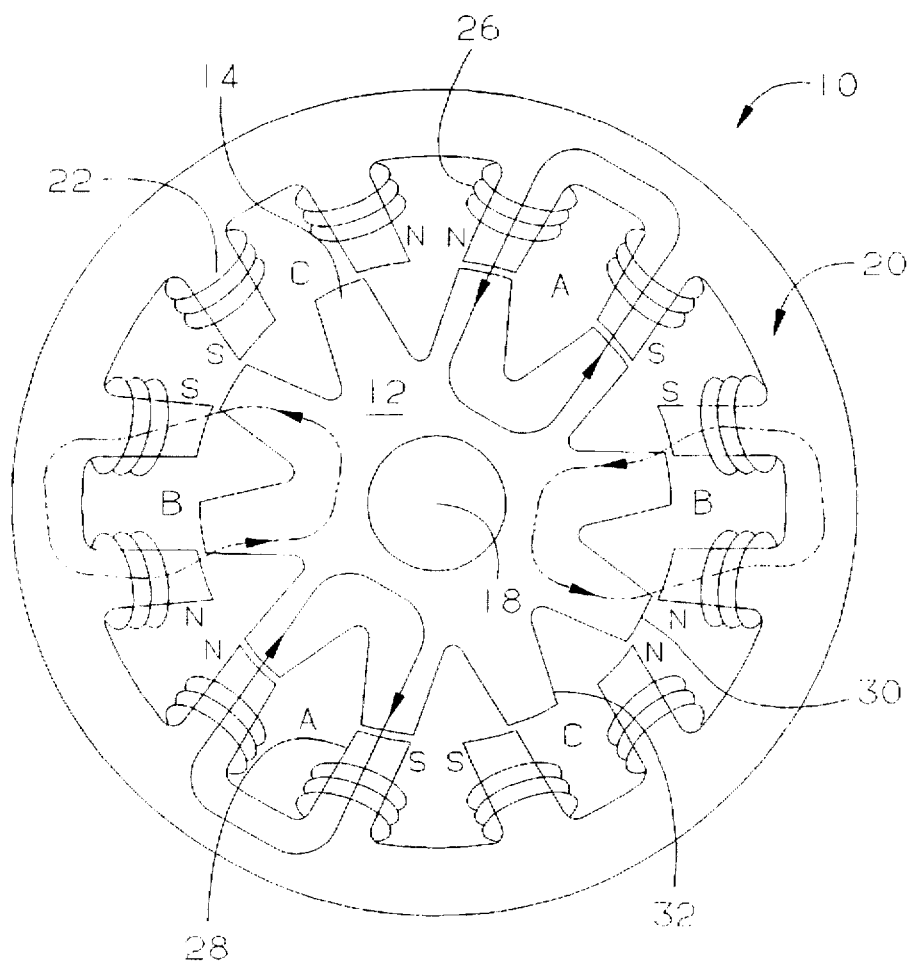
FIG. 1 illustrates an end view of a prior art variable reluctance electrical power generator.
Figure 2:
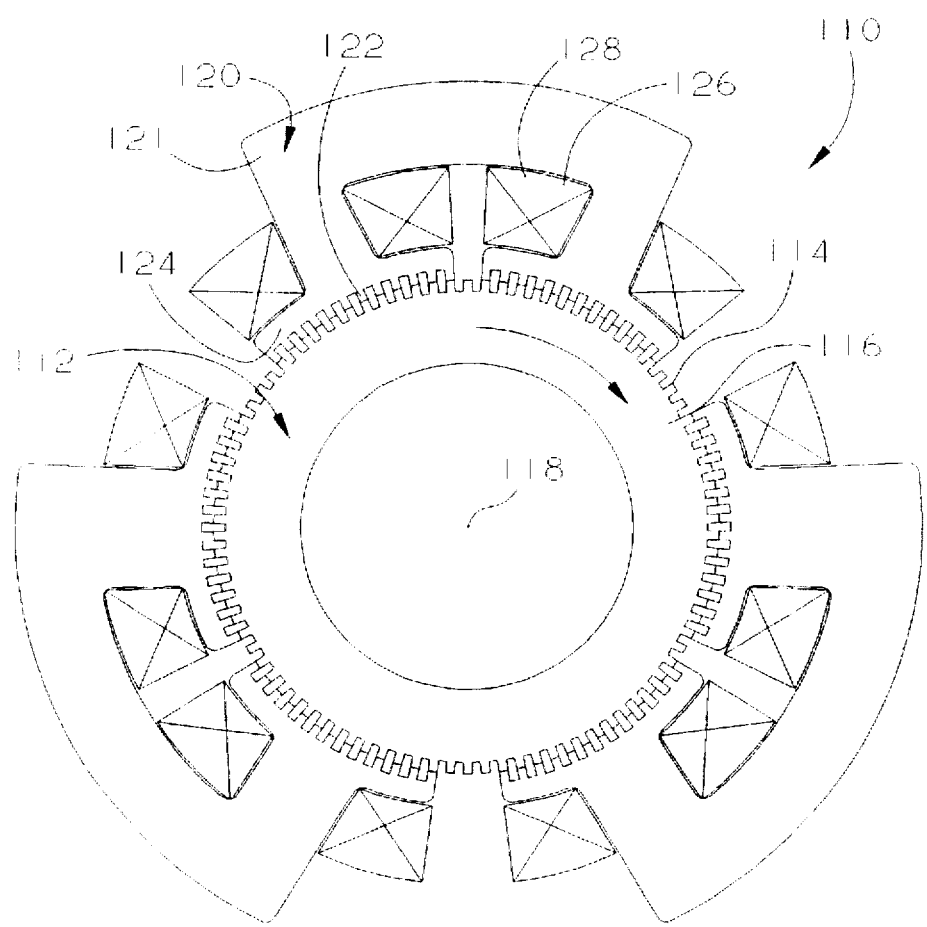
FIG. 2 illustrates an end view of a prior art variable reluctance electrical power generator in accordance with the present invention.

FIG. 2 illustrates an end view of a variable reluctance electrical power generator 110 in accordance with the present invention. The generator 110 has a rotor 112 without windings which is manufactured from a magnetically permeable material such as iron. The rotor 112 has a plurality of salient poles 114 which have the appearance of teeth which are disposed around an outer circumference 116 and project radially outward from an axis of rotation 118 and a stator 120 which is manufactured from magnetically permeable material having a plurality of salient poles 121 each divided into a plurality of salient poles 122 disposed about an inner circumference 124 which project radially inward toward the rotor 112. At least one stator phase winding 126, is wound on the stator for outputting one phase of electrical power. Typically multiple phases are used, and in a preferable embodiment the output comprises three phases. Furthermore, an exciter winding 128 is wound on the stator which may be a winding separate from the at least one stator phase winding or integral with the at least one stator phase winding. Rotation of the rotor 112 causes the salient poles 114 to rotate relative to the fixed salient poles 122 of the stator 120 to produce a variable reluctance magnetic circuit between the magnetically permeable material of the rotor 112 and the magnetically permeable material of the stator 120.

Figure 3:
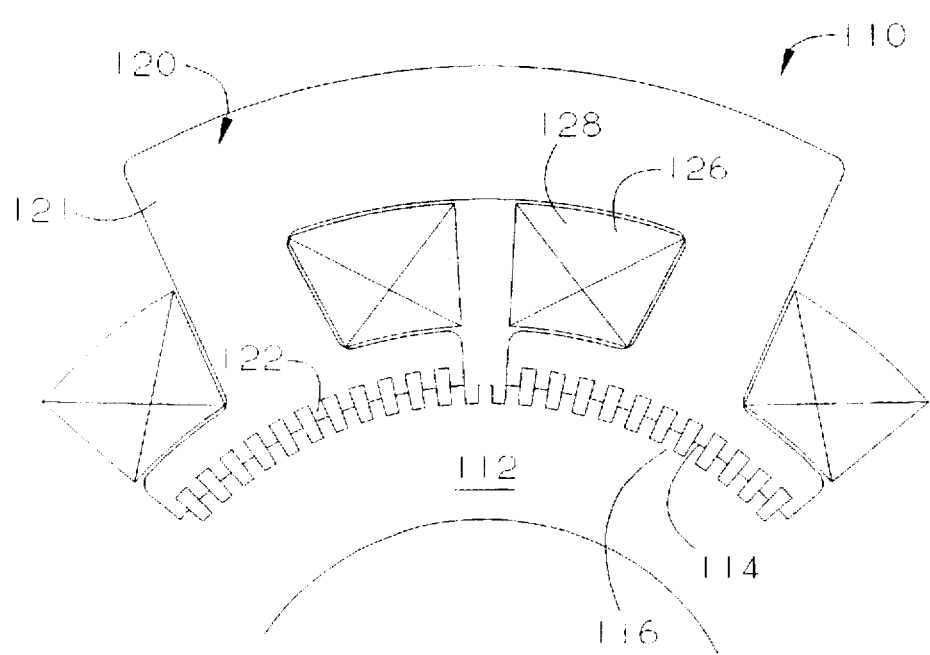
FIGS. 3–5 illustrate a sequence of positions of the rotor of the variable reluctance electrical power generation system of FIG. 2 during the generation of electrical power.
Figure 4:
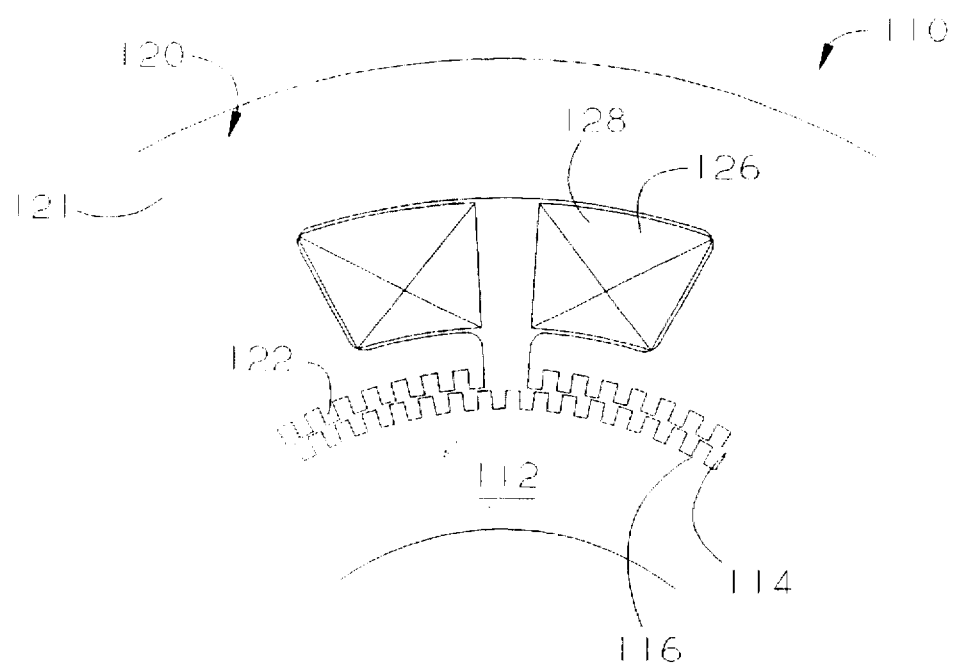
Figure 5:
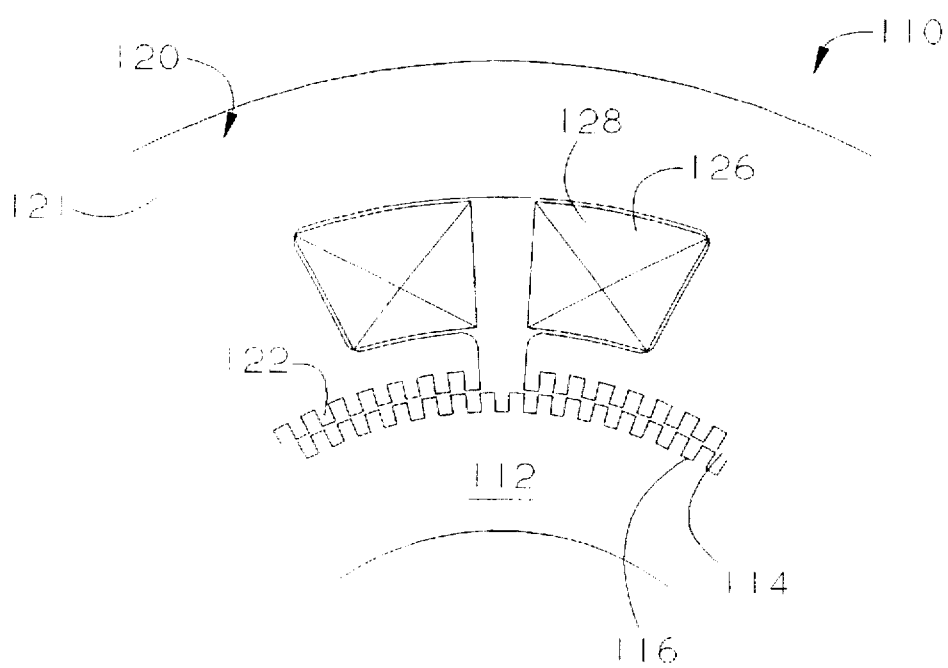
Figure 8A:
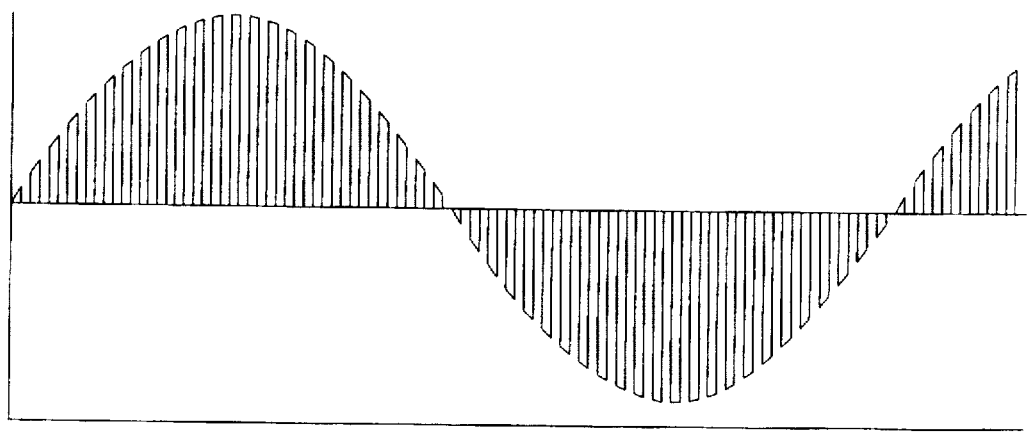
FIG. 8(a) illustrates the excitation of the exciter winding with current pulses of varying magnitude at the fundamental frequency and FIG. 8(b) illustrates the excitation of the exciter winding with current pulses at twice the fundamental frequency which are produced at each low reluctance position between the salient poles of the rotor and stator of the variable reluctance generator of the present invention.
Figure 8B:
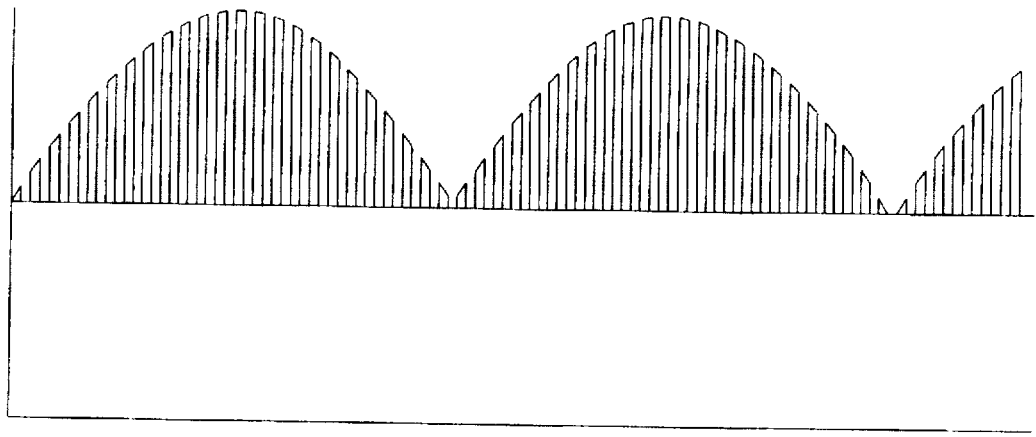

FIGS. 3–5 illustrate the rotation of the rotor 112 relative to the stator 120 during the generation of electrical power on the at least one stator phase winding 126 in response to a speed drive of the rotor 112. The exciter winding 128 is periodically pulsed with a DC current source to cause magnetic flux to build up in the magnetic circuit between the salient poles 114 and 122 of the rotor 112 and stator 120 respectively. Excitation of the exciter is timed with respect to the lowest reluctance position between the salient poles 114 and 122 of the rotor 112 and stator 120, respectively, as illustrated in FIG. 3. As stated above, a DC potential source is applied to the exciter winding 128 which may be separate from or integral with the stator winding 126 to provide pulses therein defining an envelope of positive and negative pulses at the fundamental frequency as illustrated in FIG. 8(a) or DC pulses at twice the fundamental frequency as illustrated in FIG. 8(b). When the salient poles 114 and 122 of the rotor 112 and stator 120 are respectively in the lowest reluctance position of FIG. 3, it is easiest to build up magnetic flux in the magnetic circuits which are completed by the alignment of the plurality of salient poles. It should further be understood that the number of salient poles may vary. Because the magnetic circuit between the salient poles 112 and 122 of the rotor 112 and the stator 120 is lowest in the rotary position, as illustrated in FIG. 3, the application of the DC source is timed in relation to the lowest reluctance magnetic position to achieve the most rapid current buildup in the exciter winding which results in the greatest buildup of magnetic flux. As is known, rotation of the rotor 112 away from the lowest reluctance position, as illustrated in FIG. 3, by the application of torque from an external drive, performs work which results in the generation of electrical current on the stator winding 126 which effectively is an amplification of the excitation pulse applied by the exciter winding 128. Another portion of the preferred work reduces the magnetic flux. As the flux reduces, the torque reduces, less work is performed. Flux and current reduce to zero when the reluctance is maximized and semiconductors, as described below, prevent reversed current flow which would cause motoring mode. If the exciter winding 128 is repeatedly pulsed when the salient poles 114 and 122 of the rotor 112 and stator 120 are in successive low reluctance positions, either an envelope at the fundamental frequency or twice the fundamental frequency in accordance with FIGS. 8(a) and 8(b) will be produced as described below. FIGS. 4 and 5 illustrate subsequent rotation of the rotor 112 after the exciter winding 128 has been excited with direct current pulses which results in the outputting of amplified current pulses on the at least one stator winding 126 in response to mechanical work being performed during rotation of the rotor 112 away from the low reluctance magnetic position of FIG. 3. While not illustrated, subsequent rotation past the rotary position of FIG. 5 will complete the generation of output power so that the rotor 112 is again rotated into the position as illustrated in FIG. 3 where a subsequent pulse of current will be applied to the exciter winding 128 as described above. The direction of current flow of each pulse determines the direction of current flow of each generated current pulse.

Figure 6:
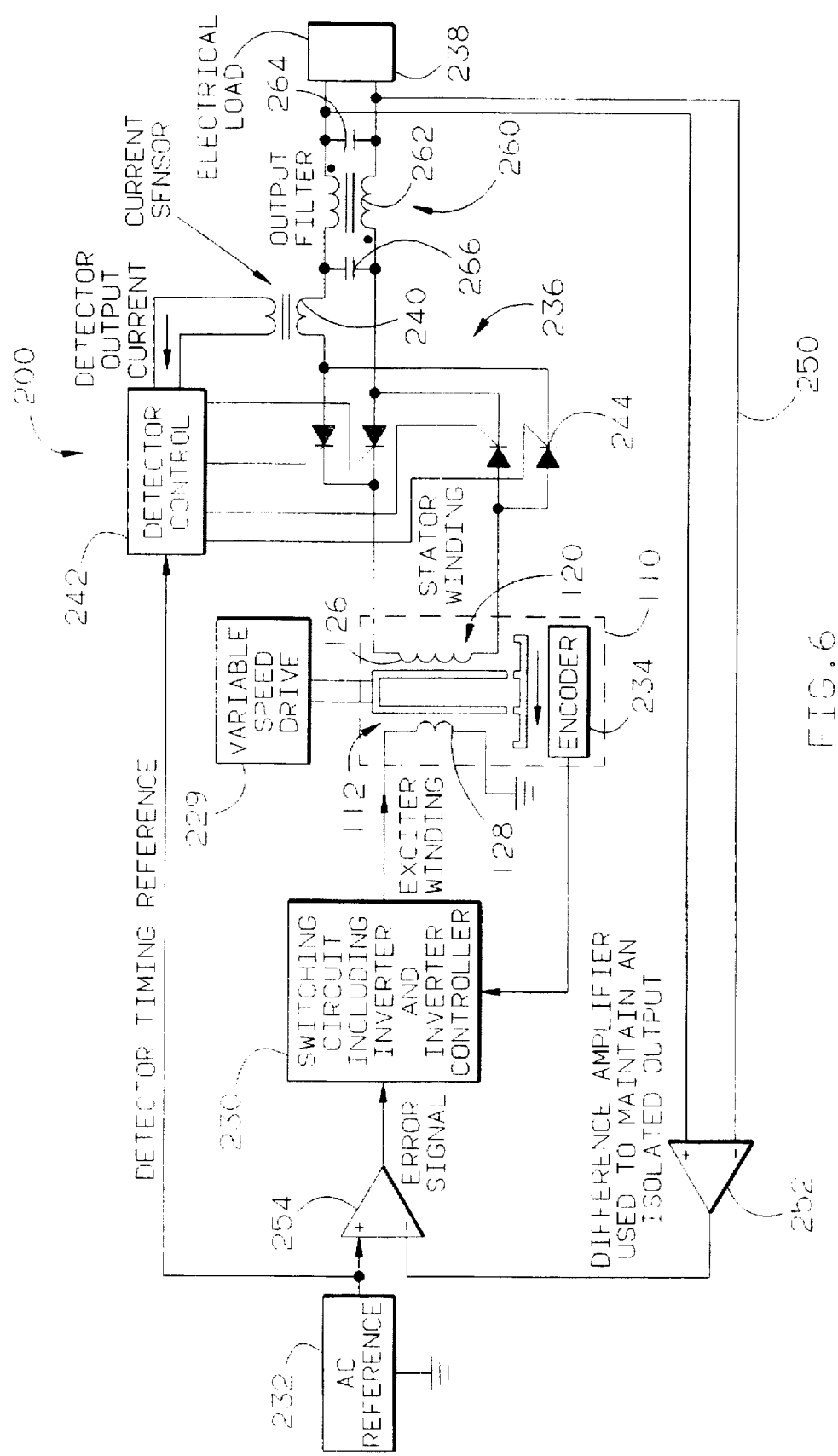
FIG. 6 illustrates a block diagram of a variable reluctance electrical power generating system for single phase electrical power in accordance with the present invention.

FIG. 6 illustrates a block diagram of a variable reluctance electrical power generating system 200 in accordance with the present invention which may have a rotor, stator and windings having a construction in accordance with the FIGS. 2–5. Only a single phase winding is illustrated but, it should be understood that in practice, typically three electrical phases are used. The generation system 200 includes a variable speed drive 229 which may be any prime mover and/or power takeoff which is driveable through a range of speeds. Furthermore, the present invention, while generating alternating current at a fundamental frequency independent of rotational speed at which the generator rotor 112 is driven, may also operate at a constant speed. The principle of generation of electrical power is in accordance with the explanation above with regard to FIGS. 3–5 in which excitation of the field winding 128 occurs when the rotor 112 is positioned relative to the stator 120 with the salient poles 114 of the rotor 112 aligned with the salient poles 122 of the stator. The variable speed drive 229 is not part of the present invention.

Figure 7:
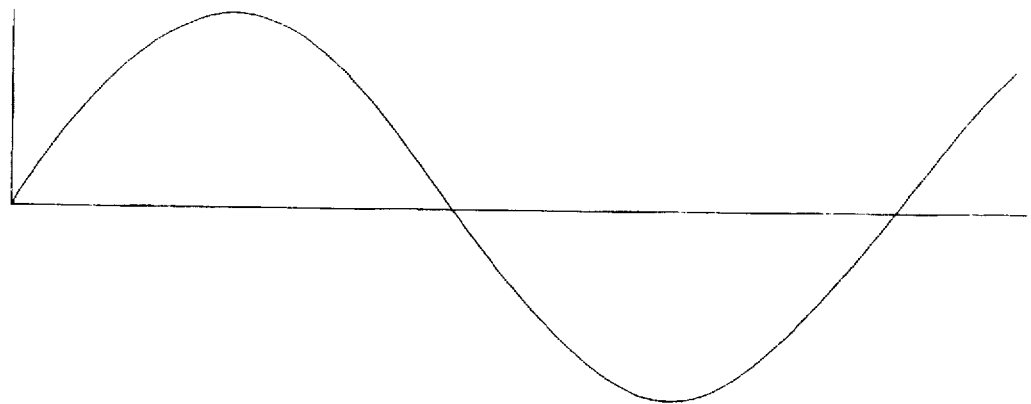
FIG. 7 illustrates a reference waveform for controlling the output waveform of the electrical power generated by the variable reluctance generator of the present invention.

A first switching circuit 230 including an inverter and an inverter controller controls the excitation of the field winding 128 to produce a series of current pulses of varying magnitude which define the fundamental frequency in the exciter winding 128. The inverter and inverter controller are of conventional design and the inverter may be a full or H bridge inverter having four solid state power switches. The series of pulses which are applied to the exciter winding 128 have a positive and negative polarity, as illustrated in FIG. 8(a), depending upon in which quadrant the reference voltage and current representing the fundamental frequency provided from AC reference 232 is in at the time of excitation of the exciter winding upon the occurrence of each lowest reluctance magnetic position as illustrated in FIG. 3. FIG. 7 illustrates a sinusoidal reference waveform at the fundamental frequency of the generated electrical power produced by AC reference 232 for controlling the waveform of the generated power from the at least one stator winding 126 which may be generated by an oscillator, or the reading out of values from a ROM for producing the sinusoidal waveform. A high resolution shaft encoder 234 is positioned adjacent to the rotor 112 for providing a rotor position signal representing the rotary position of the rotor. The encoder 234 may be of diverse designs and is not part of the present invention. The encoder 234 should have sufficient resolution to provide a signal to the switching circuit 230, including inverter and inverter controller, which precisely defines the rotary position of the rotor 112 relative to the stator 120 at the positions of FIGS. 3–5 such that the occurrence of each lowest reluctance position between the salient poles 114 and 122 of the rotor 112 and the stator 120 may be precisely determined to permit controlling of the timed application of current pulses of variable magnitude to the field winding 28 as illustrated in FIG. 8(a). Furthermore, as is illustrated in FIG. 8(a), while a constant number of current pulses will be applied to the exciter winding 128 when the rotor 112 is driven at constant speed, it should be understood that operation to produce the fundamental frequency independent of a rotational speed of driving of the rotor 12 is within the scope of the invention. When the speed of the rotor varies, the number of excitation pulses of current, as illustrated in FIG. 8(a), is varied for each cycle of the excitation current in direct proportion to the speed of rotation of the rotor. Alternatively, the first switching circuit including inverter and inverter controller 230 may produce an envelope of pulses varying at twice the fundamental frequency of the AC reference 232 as illustrated in FIG. 8(b). In this circumstance, only the magnitude of current flow is varied and not the polarity as in FIG. 8(a).

A second switching circuit 236 is connected to the at least one stator winding 126 and to electrical load 238 which may be either passive or have active devices such as switching elements such as triacs and is responsive to a current sensor 240 for detecting a direction of current flow in the electrical load. The function of the switching circuit 236 is to prevent the reverse flow of current which would cause a motoring mode. The shutoff of current at the zero current point produced in response to detection thereof prevents the motoring mode. The second switching circuit 236 includes a detector control 242 which determines the direction of current flow in the electrical load for switching of the direction of current flow through the electrical load so that each pulse applied to the exciter winding produces a pulse of corresponding polarity in the electrical load with no reverse flow of current. The detector control 242 in response to the direction of current flow in the electrical load 238 sensed by current sensor 240 in first or second directions controls the activation of at least one solid state switching element 244 for each direction which may be, for example, SCRs or triacs, to insure that each pulse of excitation applied to the field winding 128 produces a corresponding pulse of the same polarity in the at least one stator winding 126 without reverse current flow. The control of conduction of the switches 244 by the detector control 242 prevents backflow of current between the generation of successive pulses producing motoring mode.

When the excitation of the exciter winding is with pulses, such as in FIG. 8(b), then the second switching circuit 236 must invert the output from the at least one stator winding 126 at twice the fundamental frequency to the fundamental frequency and also prevent the backflow of current to prevent motoring mode. In this circumstance, only a pair of switches 244 is necessary with the polarity of switching being changed to convert the pulsation at twice the fundamental frequency into the fundamental frequency.

FIG. 9 illustrates the superposition of the envelope of current pulses A produced by the at least one stator winding 126 and the voltage B in the load 238 in which the voltage waveform B is leading the current waveform A. The waveforms A and B are not drawn to scale. In situations where the power factor is not unity, it is necessary that the current sensor 240 provide information regarding the direction of current flow so as to avoid the aforementioned backflow of current.

As can be seen, the second switching circuit 236 operates through the detector control 242 to activate pairs of switching elements 244 to insure that current flow in response to each excitation pulse from switching circuit 232 applied to field winding 128 produces a corresponding output current pulse on the at least one stator winding 126 of the same voltage polarity (for excitation in accordance with FIG. 8(a)) without the backflow of current. When the flow of fundamental current pulses of the first polarity through a first pair of conductive switches crosses through zero, as sensed by the current sensor 240, the detector control 242 switches on a second pair of switches 244 slightly later in time after turnoff of the first pair of switches caused by the reverse biasing concurrently so switching circuit 230 flips the direction of the applied current thereof to handle the flow of current in the other direction which is produced in response to excitation of pulses of the second polarity as the excitation waveform increases in magnitude in a direction of a maximum of the second polarity after crossing through zero.

In order to insure that the output alternating current applied to the electrical load 238 tracks the AC reference oscillator reference waveform as illustrated in FIG. 7, a preferred embodiment of the present invention uses feedback control as illustrated in FIG. 6. The feedback circuit includes a feedback path 250 which couples the electrical power produced by the at least one stator winding 126 as applied to the electrical load 238 to a buffer amplifier 252 which maintains isolation between the output. The output of the buffer amplifier 252 is a first input to a summer 254 which computes the difference between the AC reference 232 output signal which is a second input, such as the sinusoidal waveform of FIG. 7, and the aforementioned feedback. The resultant error signal is applied to the switching circuit 230, including inverter and inverter controller, to insure that the quality of the alternating current produced on the output tracks the reference voltage representing the desired waveform in the output.

A suitable output filter 260, which may be comprised of a transformer 262 and one or more output filter capacitors 264, filters out frequency components having a maximum frequency below a frequency of application of the pulses to the exciter winding in a conventional manner.

Capacitor 266 stores current and provides current flow between pulses.

Additionally, the detector control 242 may operate with timing provided by the AC reference 232 so as to provide an anticipatory intelligence of when to switch the switching elements 244 optimally to provide efficient operation.

It should be understood that the design of the switching circuit 230, including inverter and inverter controller, may be based upon diverse types of well-known inverters or other switching circuits which permit the generation of the current pulses as illustrated in FIGS. 8(a) and 8(b) which are timed in response to precise rotary position information produced by encoder 234 and the error control signal provided by the summer 254 to produce an accurate pulsation of current which tracks the reference voltage produced by the AC reference oscillator 232 or other signal source. Furthermore, the number of salient poles provided in the rotor and stator may be varied to accommodate the speed of operation, the size of the generator, etc. Furthermore, as a consequence of the variable speed drive 229 which is operational throughout a speed range, including potentially very high speeds when compared to speeds of synchronous machines, it may be desirable to use an advance timing such that because of the inductance of the exciter winding it is necessary to apply the pulses before the lowest reluctance position of FIG. 3.

While the invention has been described in terms of its preferred embodiments, it should be understood that numerous modifications may be made thereto without departing from the spirit and scope of the invention as defined in the appended claims. It is intended that all such modifications fall within the scope of the appended claims.

We claim:

1. A switched reluctance generator for producing alternating current at a fundamental frequency independent of a rotational speed at which the generator is driven comprising:

a rotor having a plurality of salient poles disposed around a circumference and projecting radially outward from an axis of rotation;

a stator having a plurality of salient poles disposed about an inner circumference and projecting radially inward toward the rotor;

at least one stator phase winding wound on the stator for outputting the electrical power at the fundamental frequency;

an exciter winding wound on the stator;

an electrical load coupled to the at least one stator phase winding;

a position detector for providing a rotor position signal representing a rotary position of the rotor;

a first switching circuit, responsive to the position signal, for applying time varying excitation current containing the fundamental frequency to the exciter winding in a series of pulses of varying magnitude which define the fundamental frequency or a multiple thereof and are produced by current flow through the exciter winding by switching of the first switching circuit to cause the current flow in each current pulse and each pulse being timed in relation to an occurrence of a lowest reluctance rotary position of the salient poles of the rotor and stator during rotation of the salient poles of the rotor between adjacent salient poles of the stator so as to generate a pulse on the at least one stator phase winding in response to a pulse on the exciter winding and rotation of the rotor away from the low reluctance rotary position;

a current sensor, coupled to the electrical load, for detecting a direction of current flow in the electrical load; and a second switching circuit, coupled to the at least one stator phase winding and to the electrical load and responsive to the current sensor for controlling a direction of current flow through the electrical load so that each pulse applied to the exciter winding produces a corresponding pulse in the electrical load without allowing a reversed current flow, thereby preventing motor operation.

2. A generator in accordance with claim 1 further comprising:

a variable speed drive coupled to the rotor for rotating the rotor in a speed range; and wherein the first switching circuit applies the fundamental frequency or a multiple thereof in response to the rotor position signal to the exciter winding as the series of pulses of current which vary in number for each cycle of the fundamental frequency in direct proportion to a rotational speed of the rotor.

3. A generator in accordance with claim 1 wherein:

the first switching circuit comprises an inverter having an output coupled to the exciter winding to apply the current pulses thereto.

4. A generator in accordance with claim 3 wherein:

the inverter is a full bridge inverter comprising a plurality of switches which are selectively switched on and off to control the direction of current flow through the exciter winding to apply the current pulses thereto.

5. A generator in accordance with claim 2 wherein:

the first switching circuit comprises an inverter having an output coupled to the exciter winding to apply the current pulses thereto.

6. A generator in accordance with claim 5 wherein:

the inverter is a full bridge inverter comprising a plurality of switches which are selectively switched on and off to control the direction of current flow through the exciter winding to apply the current pulses thereto.

7. A generator in accordance with claim 3 further comprising:

a signal source for providing a reference signal at the fundamental frequency which represents a desired waveform of output power to be produced by the at least one stator winding and applied to the electrical load; and an inverter controller, coupled to the inverter, for controlling switches in the inverter to control a direction of current flow from the direct current source; and wherein the inverter control is responsive to the reference signal and the position signal for controlling timing of generation of the pulses which are applied to the exciter winding.

8. A generator in accordance with claim 4 further comprising:

a signal source for providing a reference signal at the fundamental frequency which represents a desired waveform of output power to be applied to the electrical load; and an inverter controller, coupled to the inverter, for controlling switches in the inverter to control a direction of current flow from the direct current source; and wherein the inverter control is responsive to the reference signal and the position signal for controlling timing of generation of the pulses which are applied to the exciter winding.

9. A generator in accordance with claim 5 further comprising:

a signal source for providing a reference signal at the fundamental frequency which represents a desired waveform of output power to be applied to the electrical load; and an inverter controller, coupled to the inverter, for controlling switches in the inverter to control a direction of current flow from a direct current source; and wherein the inverter control is responsive to the reference signal and the position signal for controlling timing of generation of the pulses which are applied to the exciter winding.

10. A generator in accordance with claim 6 further comprising:

a signal source for providing a reference signal at the fundamental frequency which represents a desired waveform of output power to be applied to the electrical load; and an inverter controller, coupled to the inverter, for controlling switches in the inverter to control a direction of current flow from a direct current source; and wherein the inverter controller is responsive to the reference signal and the position signal for controlling timing of generation of the pulses which are applied to the exciter winding.

11. A generator in accordance with claim 1 further comprising:

a filter, coupled to the second switching circuit and to the electrical load, for attenuating coupling of frequency components having a maximum frequency from the at least one phase winding to the electrical load below a frequency of application of the pulses to the exciter winding; and an error signal generator, coupled to a signal source for providing a reference signal at the fundamental frequency which represents a desired waveform of output power to be applied to the electrical load and to a feedback signal representing the alternating current applied to the electrical load, for generating an error control signal representing a difference between the reference signal and the feedback signal which is applied to the first switching circuit to cause the fundamental frequency applied to the electrical load to track the reference signal.

12. A generator in accordance with claim 2 further comprising:

a filter, coupled to the second switching circuit and to the electrical load, for attenuating coupling of frequency components having a maximum frequency from the at least one phase winding to the electrical load below a frequency of application of the pulses to the exciter winding; and an error signal generator, coupled to a signal source for providing a reference signal at the fundamental frequency which represents a desired waveform of output power to be applied to the electrical load and to a feedback signal representing the alternating current applied to the electrical load, for generating an error control signal representing a difference between the reference signal and the feedback signal which is applied to the first switching circuit to cause the fundamental frequency applied to the electrical load to track the reference signal.

13. A generator in accordance with claim 3 further comprising:

a filter, coupled to the second switching circuit and to the electrical load, for attenuating coupling of frequency components having a maximum frequency from the at least one phase winding to the electrical load below a frequency of application of the pulses to the exciter winding; and an error signal generator, coupled to a signal source for providing a reference signal at the fundamental frequency which represents a desired waveform of output power to be applied to the electrical load and to a feedback signal representing the alternating current applied to the electrical load, for generating an error control signal representing a difference between the reference signal and the feedback signal which is applied to the first switching circuit to cause the fundamental frequency applied to the electrical load to track the reference signal.

14. A generator in accordance with claim 4 further comprising:

a filter, coupled to the second switching circuit and to the electrical load, for attenuating coupling of frequency components having a maximum frequency from the at least one phase winding to the electrical load below a frequency of application of the pulses to the exciter winding; and an error signal generator, coupled to a signal source for providing a reference signal at the fundamental frequency which represents a desired waveform of output power to be applied to the electrical load and to a feedback signal representing the alternating current applied to the electrical load, for generating an error control signal representing a difference between the reference signal and the feedback signal which is applied to the first switching circuit to cause the fundamental frequency applied to the electrical load to track the reference signal.

15. A generator in accordance with claim 5 further comprising:

a filter, coupled to the second switching circuit and to the electrical load, for attenuating coupling of frequency components having a maximum frequency from the at least one phase winding to the electrical load below a frequency of application of the pulses to the exciter winding; and an error signal generator, coupled to a signal source for providing a reference signal at the fundamental frequency which represents a desired waveform of output power to be applied to the electrical load and to a feedback signal representing the alternating current applied to the electrical load, for generating an error control signal representing a difference between the reference signal and the feedback signal which is applied to the first switching circuit to cause the fundamental frequency applied to the electrical load to track the reference signal.

16. A generator in accordance with claim 6 further comprising:

a filter, coupled to the second switching circuit and to the electrical load, for attenuating coupling of frequency components having a maximum frequency from the at least one phase winding to the electrical load below a frequency of application of the pulses to the exciter winding; and an error signal generator, coupled to a signal source for providing a reference signal at the fundamental frequency which represents a desired waveform of output power to be applied to the electrical load and to a feedback signal representing the alternating current applied to the electrical load, for generating an error control signal representing a difference between the reference signal and the feedback signal which is applied to the first switching circuit to cause the fundamental frequency applied to the electrical load to track the reference signal.

17. A generator in accordance with claim 7 further comprising:

a filter, coupled to the second switching circuit and to the electrical load, for attenuating coupling of frequency components having a maximum frequency from the at least one phase winding to the electrical load below a frequency of application of the pulses to the exciter winding; and an error signal generator, coupled to the signal source and to a feedback signal representing the alternating current applied to the electrical load, for generating an error control signal representing a difference between the reference signal and the feedback signal which is applied to the first switching current to cause the fundamental frequency applied to the electrical load to track the reference signal.

18. A generator in accordance with claim 8 further comprising:

a filter, coupled to the second switching circuit and to the electrical load, for attenuating coupling of frequency components having a maximum frequency from the at least one phase winding to the electrical load below a frequency of application of the pulses to the exciter winding; and an error signal generator, coupled to the signal source and to a feedback signal representing the alternating current applied to the electrical load, for generating an error control signal representing a difference between the reference signal and the feedback signal which is applied to the first switching current to cause the fundamental frequency applied to the electrical load to track the reference signal.

19. A generator in accordance with claim 9 further comprising:

a filter, coupled to the second switching circuit and to the electrical load, for attenuating coupling of frequency components having a maximum frequency from the at least one phase winding to the electrical load below a frequency of application of the pulses to the exciter winding; and an error signal generator, coupled to the signal source and to a feedback signal representing the alternating current applied to the electrical load, for generating an error control signal representing a difference between the reference signal and the feedback signal which is applied to the first switching current to cause the fundamental frequency applied to the electrical load to track the reference signal.

20. A generator in accordance with claim 10 further comprising:

a filter, coupled to the second switching circuit and to the electrical load, for attenuating coupling of frequency components having a maximum frequency from the at least one phase winding to the electrical load below a frequency of application of the pulses to the exciter winding; and an error signal generator, coupled to the signal source and to a feedback signal representing the alternating current applied to the electrical load, for generating an error control signal representing a difference between the reference signal and the feedback signal which is applied to the first switching current to cause the fundamental frequency applied to the electrical load to track the reference signal.

21. A method of operation of a variable reluctance generator for producing alternating current at a fundamental frequency independent of a rotational speed at which the generator is driven and having a rotor having a plurality of salient poles disposed around a circumference and projecting radially outward from an axis of rotation, a stator having a plurality of salient poles disposed about an inner circumference and projecting radially inward toward the rotor, at least one stator phase winding wound on the stator, an exciter winding wound on the stator, an electrical load coupled to the at least one stator winding, a rotor position detector for providing a rotor position signal representing a rotary position of the rotor, a first switching circuit, a current sensor coupled to the electrical for detecting a direction of current flow in the electrical load, and a second switching circuit coupled to the at least one stator phase winding and to the electrical load comprising:

in response to the rotor position signal applying to the exciter winding with the first switching circuit a time varying excitation current in a series of pulses of varying magnitude which define the fundamental frequency or a multiple thereof by switching of the first switching circuit to cause the current flow in each current pulse and each pulse being timed in relation to an occurrence of a lowest reluctance rotary position of the salient poles of the rotor and stator during rotation of the salient poles of the rotor between the adjacent salient poles of the stator so as to generate a pulse on the at least one stator phase winding in response to a pulse on the exciter winding and rotation of the rotor away from the low reluctance rotary position; and in response to a direction of sensed current flow in the electrical load the second switching circuit controlling a direction of current flow so that each pulse applied to the exciter produces a corresponding pulse in the electrical load without allowing a reversed current flow, thereby preventing motor operation.

22. A method in accordance with claim 21 wherein:

the rotor is driven with a variable speed drive in a speed range; and the first switching circuit applies the fundamental frequency or a multiple thereof in response to the rotor position signal to the exciter winding as the series of pulses of current which vary in number for each cycle of the fundamental frequency in direction proportion to a rotational speed of the rotor.

* * * * *